United States Patent
Griebel et al.

(10) Patent No.: US 12,331,188 B2
(45) Date of Patent: Jun. 17, 2025

(54) TEMPERATURE STABLE POLYMERIC BLENDS FOR USE IN NON-PNEUMATIC TIRES

(71) Applicant: Bridgestone Americas Tire Operations, LLC, Nashville, TN (US)

(72) Inventors: Jared J. Griebel, Orange Village, OH (US); Hyeonjae Kim, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 817 days.

(21) Appl. No.: 17/597,791

(22) PCT Filed: May 18, 2020

(86) PCT No.: PCT/US2020/033385
§ 371 (c)(1),
(2) Date: Jan. 24, 2022

(87) PCT Pub. No.: WO2021/021273
PCT Pub. Date: Feb. 4, 2021

(65) Prior Publication Data
US 2022/0243054 A1    Aug. 4, 2022

Related U.S. Application Data

(60) Provisional application No. 62/879,593, filed on Jul. 29, 2019.

(51) Int. Cl.
*C08L 67/02* (2006.01)
*B60C 1/00* (2006.01)
*B60C 7/14* (2006.01)

(52) U.S. Cl.
CPC .............. *C08L 67/025* (2013.01); *B60C 1/00* (2013.01); *B60C 2001/0091* (2013.01); *B60C 7/146* (2021.08)

(58) Field of Classification Search
CPC ...... C08L 67/025; C08L 2207/04; B60C 1/00; B60C 7/146; B60C 2001/0091; B29B 7/72; B29B 7/007; B29B 7/82; B29B 7/46; C08K 5/1515; C08K 5/17
See application file for complete search history.

(56) References Cited

U.S. PATENT DOCUMENTS

| | | |
|---|---|---|
| 3,723,568 A | 3/1973 | Hoeschele |
| 5,371,143 A | 12/1994 | Novak et al. |
| 2006/0142442 A1 | 6/2006 | Scherzer et al. |
| 2008/0081873 A1 | 4/2008 | Kanae et al. |
| 2008/0185558 A1 | 8/2008 | Hein et al. |
| 2015/0101728 A1* | 4/2015 | Fudemoto ............ B60C 1/0041 152/537 |
| 2018/0002524 A1 | 1/2018 | El-Hibri et al. |
| 2019/0329590 A1 | 10/2019 | Araujo Da Silva et al. |
| 2020/0262241 A1 | 8/2020 | Eguchi |
| 2021/0039438 A1 | 2/2021 | Kim et al. |
| 2021/0362548 A1 | 11/2021 | Oddon et al. |
| 2022/0243052 A1 | 8/2022 | Griebel et al. |
| 2022/0243054 A1 | 8/2022 | Griebel et al. |

FOREIGN PATENT DOCUMENTS

| | | |
|---|---|---|
| CN | 102850729 A | 1/2013 |
| CN | 109963725 A | 7/2019 |
| EP | 0133357 A2 | 2/1985 |
| JP | S60-53562 A | 3/1985 |
| JP | H06-207086 A | 7/1994 |
| WO | 2005-116128 A1 | 12/2005 |
| WO | 2006-119059 A1 | 11/2006 |
| WO | 2007-022990 A1 | 3/2007 |
| WO | 2011-106760 A2 | 9/2011 |
| WO | 2013-171280 A1 | 11/2013 |
| WO | 2015-160592 A1 | 11/2015 |
| WO | 2018-234693 A1 | 12/2018 |
| WO | 2019-093212 A1 | 5/2019 |
| WO | 2019-093747 A1 | 5/2019 |

OTHER PUBLICATIONS

XP002809782 document from EPO, relating to JPH06-207086A.
XP002809783 document from EPO, relating to CN102805729A.
Zhao, et al., "Advance of Non-Pneumatic Wheels and Mechanical Characteristics," Journal of Jiangsu University (Natural Science Edition), vol. 37, issue 6, 2016, pp. 621-627.
Arnitel TPE Brochure, by DSM Engineering Plastics, downloaded Jul. 17, 2019.
Design Guide for Hytrel, by DuPont, undated, downloaded Jul. 17, 2019.
Pawlak, et al., "Characterization of Scrap Poly(ethylene)terephthalate," European Polymer Journal, 36 (2008), pp. 1875-1884.

(Continued)

*Primary Examiner* — Doris L Lee
(74) *Attorney, Agent, or Firm* — Shaun J. Fox; Jenny L. Sheaffer

(57) ABSTRACT

Disclosed herein are polymeric blends suitable for use in non-pneumatic tires, processes for preparing the polymeric blends, and non-pneumatic tires and components thereof incorporating the polymeric blend. The polymeric blends include a thermoplastic polyester elastomer, a high temperature thermoplastic polymer, a compatibilizer resin, a delayed crosslinking agent, and an activator.

20 Claims, No Drawings

(56) References Cited

OTHER PUBLICATIONS

Hytrel Product Reference Guide, by DuPont, undated, downloaded Feb. 28, 2019.
Hytrel 30HS Production Information, by DuPont, dated Sep. 20, 2016.
Hytrel 5555HS-TPC Campus Datasheet, by Celanese, dated May 16, 2023.
InChem Phenoxy Resin Brochure, by InChem Corp., undated, downloaded Mar. 15, 2019.
Kopel KP3340 Product Information, by Kolon Plastics, Inc., undated, downloaded Apr. 19, 2023.
LNP Lubricomp Brochure, by SABIC, copyright 2016.
LUVOCOM Brochure, by Lehmann & Voss & Co., undated, downloaded Jul. 17, 2019.
Mascia, et al., "Blends of Aromatic Polysulphones And Alkane Terephthalate Polymers: Compatibilization With Polyhydroxyether of Bisphenol-A," High Perform. Polymer., vol. 8 (1996), pp. 119-131.
Materials Data Book, by Cambridge Univ. Eng. Dept., 2003 edition.
Pelprene Brochure, by Toyobo USA Inc., copyright 2019, downloaded Jul. 17, 2019.
Riteflex Technical Manual, by Celanese, copyright 2013.
RTP 1400 Polyethersulfone Product Data Sheet, by RTP Company, dated Jul. 24, 2009.
ThreeBond Technical News, by Three Bond Co. Ltd., Dec. 20, 1990.
Ultrason Brochure, by BASF, undated, downloaded Jul. 17, 2019.
Veradel PESU Brochure, by Solvay, copyright 2019, downloaded Feb. 28, 2019.
Veradel A-301 Nt Brochure, by Solvay, copyright 2019, downloaded Mar. 28, 2019.
Veradel PESU Tech. Data Sheets, by Solvay, copyright 2019, downloaded Feb. 28, 2019.
Extended European Search Report and Opinion in application EP 20847450.2, mailed Aug. 2, 2023.
International Preliminary Report on Patentability and Written Opinion, in application PCT/US2020033386, mailed Feb. 1, 2022.
International Search Report, in application PCT/U.S. Pat. No. 2020033386, dated Sep. 3, 2020.
Polyethersulfone (PES)—Complete Guide, by Omnexus by Special Chem, copyright 2019, downloaded Feb. 28, 2019.
Veradel A-301 Brochure, by Solvay, copyright 2019, downloaded Mar. 28, 2019.
Extended European Search Report and Opinion in application EP 20847972.5, mailed Jul. 31, 2023.
International Preliminary Report on Patentability and Written Opinion, in application PCT/US2020/033385, mailed Feb. 1, 2022.
International Search Report, in application PCT/US2020/033385, dated Aug. 27, 2020.
Wei, Huang, "Pavement Design Theory and Method for Long-Span Bridge," China Architecture & Building Press, Chapter 3 excerpt, pp. 70-72, copyright 2006.

* cited by examiner

TEMPERATURE STABLE POLYMERIC BLENDS FOR USE IN NON-PNEUMATIC TIRES

This application is a national stage application of PCT/US2020/033385 filed on May 18, 2020, which claims the benefit of U.S. Provisional Application Ser. No. 62/879,593 filed on Jul. 29, 2019, all of which are incorporated herein by reference in their entirety.

FIELD

The present application is directed to polymeric blends suitable for use in non-pneumatic tires, processes for preparing the polymeric blends, and non-pneumatic tires and components thereof incorporating the polymeric blend.

BACKGROUND

While conventional tires are inflated with air, non-pneumatic tires can be considered airless in that they do not rely upon air inflation to support vehicle weight or to absorb shock from a road surface. A non-pneumatic tire offers advantages with respect to lower maintenance and lack of puncture risk. Various designs have been proposed for non-pneumatic tires certain of which make use of a network of spokes connected (directly or indirectly) to an inner rim-like structure and covered by an outer band or ring and a relatively thin layer of rubber. In such a design, the spokes function to provide support for the vehicle weight and their construction and composition is of critical importance in the design of the overall non-pneumatic tire.

SUMMARY

Disclosed herein are polymeric blends suitable for use in non-pneumatic tires, processes for preparing the polymeric blends, and non-pneumatic tires and components thereof incorporating the polymeric blend.

In a first embodiment, a temperature stable polymeric blend is provided. According to the first embodiment, the polymeric blend comprises: (a) a thermoplastic polyester elastomer, preferably a polyether-polyester block copolymer, having at least one of: (i) a Tg of about 50 to about 100° C., preferably about 50 to about 80° C., or (ii) a melt temperature of about 200 to about 280, preferably about 210 to about 260° C., (b) a high temperature thermoplastic polymer, preferably a polysulfone polymer, having at least one of: (i) a Tg of about 200 to about 300° C., preferably about 200 to about 275° C., or (ii) a melt temperature of about 300 to about 400° C., preferably about 320 to about 390° C., (c) a compatibilizer resin, preferably a phenoxy resin, (d) a delayed crosslinking agent, preferably an epoxy compound, and (e) an activator, preferably an amine-based activator, wherein the total amount of (a) and (b) is 100 parts and (a) is present in an amount of 30-95 parts, preferably 30-80 parts, more preferably 30-50 parts and (b) is present in an amount of 5-70 parts, preferably 20-70 parts, more preferably 50-70 parts.

In a second embodiment, a process for preparing a temperature stable polymeric blend is provided. According to the second embodiment, the process comprises heating a high temperature thermoplastic polymer (preferably a polysulfone polymer) to melt the polymer, the high temperature thermoplastic polymer having at least one of: (a) a Tg of about 200 to about 300° C., preferably about 200 to about 275° C., or (b) a melt temperature of about 300 to about 400° C., preferably about 320 to about 390° C.; mixing (i) a thermoplastic polyester elastomer (preferably a polyether-polyester block copolymer), (ii) a compatibilizer resin (preferably a phenoxy resin), (iii) a delayed crosslinking agent (preferably an epoxy compound), and (iv) optionally an activator, with the melted polymer to form a blend, wherein the thermoplastic polyester elastomer meets at least one of the following: (c) a Tg of about 50 to about 100° C., preferably about 50 to about 80° C., or (d) a melt temperature of about 200 to about 280, preferably about 210 to about 260° C., wherein the heating and mixing occur in an extruder, preferably a twin-screw extruder.

In a third embodiment, a non-pneumatic tire having a component made from the temperature stable polymeric blend of the first embodiment is disclosed.

In a fourth embodiment, a non-pneumatic tire spoke made by an injection molding process (according to an embodiment of the process of the second embodiment) and a non-pneumatic tire comprising one or more such spokes is disclosed.

DETAILED DESCRIPTION

Disclosed herein are polymeric blends suitable for use in non-pneumatic tires, processes for preparing the polymeric blends, and non-pneumatic tires and components thereof incorporating the polymeric blend.

In a first embodiment, a temperature stable polymeric blend is provided. According to the first embodiment, the polymeric blend comprises: (a) a thermoplastic polyester elastomer, preferably a polyether-polyester block copolymer, having at least one of: (i) a Tg of about 50 to about 100° C., preferably about 50 to about 80° C., or (ii) a melt temperature of about 200 to about 280, preferably about 210 to about 260° C., (b) a high temperature thermoplastic polymer, preferably a polysulfone polymer, having at least one of: (i) a Tg of about 200 to about 300° C., preferably about 200 to about 275° C., or (ii) a melt temperature of about 300 to about 400° C., preferably about 320 to about 390° C., (c) a compatibilizer resin, preferably a phenoxy resin, (d) a delayed crosslinking agent, preferably an epoxy compound, and (e) an activator, preferably an amine-based activator, wherein the total amount of (a) and (b) is 100 parts and (a) is present in an amount of 30-95 parts, preferably 30-80 parts, more preferably 30-50 parts and (b) is present in an amount of 5-70 parts, preferably 20-70 parts, more preferably 50-70 parts.

In a second embodiment, a process for preparing a temperature stable polymeric blend is provided. According to the second embodiment, the process comprises heating a high temperature thermoplastic polymer (preferably a polysulfone polymer) to melt the polymer, the high temperature thermoplastic polymer having at least one of: (a) a Tg of about 200 to about 300° C., preferably about 200 to about 275° C., or (b) a melt temperature of about 300 to about 400° C., preferably about 320 to about 390° C.; mixing (i) a thermoplastic polyester elastomer (preferably a polyether-polyester block copolymer), (ii) a compatibilizer resin (preferably a phenoxy resin), (iii) a delayed crosslinking agent (preferably an epoxy compound), and (iv) optionally an activator, with the melted polymer to form a blend, wherein the thermoplastic polyester elastomer meets at least one of the following: (c) a Tg of about 50 to about 100° C., preferably about 50 to about 80° C., or (d) a melt temperature of about 200 to about 280, preferably about 210 to about 260° C., wherein the heating and mixing occur in an extruder, preferably a twin-screw extruder.

In a third embodiment, a non-pneumatic tire having a component made from the temperature stable polymeric blend of the first embodiment is disclosed.

In a fourth embodiment, a non-pneumatic tire spoke made by an injection molding process (according to an embodiment of the process of the second embodiment) and a non-pneumatic tire comprising one or more such spokes is disclosed.

Temperature Stable Polymeric Blend

As mentioned above, the first embodiment disclosed herein is directed to a temperature stable polymeric blend. As discussed in more detail below, the temperature stable aspect of the polymeric blend refers to the ability of the blend to maintain its strength over a broad range of temperatures, such as may be encountered by a non-pneumatic tire during operation of a commercial vehicle (e.g., a tractor-trailer or bus). As used herein with respect to all of the embodiments, the phrase "temperature stable" refers to the ability of the blend to maintain at least 90% of its Modulus (e.g., 90%, 91%, 92%, 93%, 94%, 95% or more, 90-99%, 90-98%, 90-97%, 90-96%, 90-95%, etc.) over a temperature range of −40 to 190° C., with the Modulus referring to the MPa measurement at at least one of 50% Modulus or 100% Modulus, preferably both. In addition to maintaining its strength over a broad range of temperatures, the polymeric blend also preferably has a modulus of elasticity within a specified range and is processable via injection molding, both as discussed in more detail below. Since the temperature stable polymeric blend is ultimately crosslinked (i.e., by the delayed crosslinking agent) it can also be considered to be a temperature stable crosslinked polymeric blend and each instance herein of the phrase "temperature stable polymeric blend" should be also considered to refer to a "temperature stable crosslinked polymeric blend."

Generally, the temperature stable polymeric blend comprises (a) a thermoplastic polyester elastomer, (b) a high temperature thermoplastic polymer, (c) a compatibilizer resin, (d) a delayed crosslinking agent, and (e) an activator, each as discussed in more detail below. The particular amount of each of components (a)-(e) that is used to prepare the temperature stable polymeric blend may vary. Preferably, when the total amount of (a) and (b) is considered to be 100 parts, (a) is present in an amount of 30-95 parts (e.g., 30, 35, 40, 45, 50, 55, 60, 65, 70, 75, 80, 85, 90 or 95 parts), preferably 30-80 parts (e.g., 30, 35, 40, 45, 50, 55, 60, 65, 70, 75, or 80 parts), more preferably 30-50 parts (e.g., 30, 32, 34, 35, 36, 38, 40, 42, 44, 45, 46, 48, or 50 parts) and (b) is present in an amount of 5-70 parts (e.g., 5, 10, 15, 20, 25, 30, 35, 40, 45, 50, 55, 60, 65, or 70 parts), preferably 20-70 parts (e.g., 20, 25, 30, 35, 40, 45, 50, 55, 60, 65, or 70 parts), more preferably 50-70 parts (e.g., 50, 52, 54, 55, 56, 58, 60, 62, 64, 65, 66, 68, or 70 parts). The amount of compatibilizer resin (c) that is used to prepare the temperature stable polymeric blend may vary. In preferred embodiments, the compatibilizer resin (c) is used in an amount of about 5 to about 20% by weight or 5 to 20% by weight (e.g., 5, 6, 8, 10, 12, 14, 15, 16, 18, or 20% by weight), based upon the total weight of (a) and (b), preferably in an amount of about 8 to about 15% by weight or 8 to 15% by weight (e.g., 8, 10, 12, 14, or 15% by weight, based upon the total weight of (a) and (b). As a non-limiting example, if (a) is used in an amount of 40 parts and (b) is used in an amount of 60 parts, then (c) could be used in an amount of 10 parts (which would correspond to 10% by weight based upon the total weight of (a) and (b)) or in an amount of 15 parts (which would correspond to 15% by weight based upon the total weight of (a) and (b)). The amount of crosslinking agent (d) that is used to prepare the temperature stable polymeric blend may vary. In preferred embodiments, the crosslinking agent (d) is used in an amount of about 0.5 to about 5% by weight or 0.5 to 5% by weight (e.g., 0.5, 1, 1.5, 2, 2.5, 3, 3.5, 4, 4.5, or 5% by weight, based upon the total weight of (a) and (b), preferably in an amount of about 1 to about 5% by weight or 1 to 5% by weight (e.g., 1, 1.5, 2, 2.5, 3, 3.5, 4, 4.5, or 5% by weight), based upon the total weight of (a) and (b). As a non-limiting example, if (a) is used in an amount of 40 parts and (b) is used in an amount of 60 parts, then (d) could be used in an amount of 10 parts (which would correspond to 10% by weight based upon the total weight of (a) and (b)) or in an amount of 15 parts (which would correspond to 15% by weight based upon the total weight of (a) and (b)). The amount of activator (e) that is used to prepare the temperature stable polymeric blend may vary. In preferred embodiments, the activator (e) is used in an amount of about 0.1 to about 10% by weight or 0.1 to 10% by weight (e.g., 0.1, 0.5, 1, 1.5, 2, 2.5, 3, 3.5, 4, 4.5, 5, 5.5, 6, 6.5, 7, 7.5, 8, 8.5, 9, 9.5 or 10% by weight), based upon the total weight of (a) and (b), preferably in an amount of about 0.5 to about 2% by weight or 0.5 to 2% by weight (e.g., 0.5, 1, 1.5, or 2% by weight), based upon the total weight of (a) and (b). By stating that the amount of activator is within one of the foregoing ranges in an amount by weight based upon the total weight of (a) and (b) is meant that the total amount of (a) and (b) is set at 100 parts and the amount of activator is calculated accordingly. As a non-limiting example, the use of 5% by weight activator, based upon the total weight of (a) and (b) can be understood as equating to 5 parts of activator with a total amount of 100 parts of (a) and (b). In certain preferred embodiments, each of (a)-(e) are used in the preferred ranges or amounts discussed above. In certain particularly preferred embodiments, each of (a)-(e) are used in the more preferred ranges or amounts discussed above.

In certain embodiments of the first-fourth embodiments, the temperature stable polymeric blend and/or a non-pneumatic tire spoke made therefrom and/or a non-pneumatic tire containing such a spoke contains no polyurethane polymer. In other words, in such embodiments, less than 1 weight % (e.g., 0.9 weight %, 0.8 weight %, 0.7 weight %, 0.6 weight %, 0.5 weight %, 0.4 weight %, 0.3 weight %, 0.2 weight %, 0.1 weight % or less) of polyurethane polymer, more preferably 0 weight % of polyurethane polymer is present in the temperature table polymeric blend, non-pneumatic tire spoke made therefrom, and/or non-pneumatic tire containing such a spoke.

In other embodiments of the first-fourth embodiments, at least a portion of the thermoplastic polyester elastomer is replaced by a thermoplastic polyurethane having a Tg that is similar to the thermoplastic polyester elastomer discussed herein and/or a melt temperature that is similar to the thermoplastic polyester elastomer discussed herein.

Disclosed herein as sub-embodiments of the first embodiment, are a pelletized version of the temperature stable polymeric blend, rods or strands of the temperature stable polymeric blend, non-pneumatic tire components made from the temperature stable polymeric blend (e.g., spokes), and a non-pneumatic tire having at least one component made from the temperature stable polymeric blend, preferably one or more spokes connecting an inner rim and an outer band or ring of the tire.

Thermoplastic Polyester Elastomer

As discussed above, the temperature stable polymeric blend of the first-fourth embodiments includes a thermoplastic polyester elastomer (component (a)). A thermoplastic polyester elastomer is generally understood as being a copolymer which includes both thermoplastic and elastomeric blocks, providing the copolymer with performance benefits of elastomers (e.g., flexibility at low temperatures) and of thermoplastics (e.g., retention of strength at high temperature). Suitable thermoplastic polyester elastomers for use in the blend will meet at least one of the following (i) a Tg of about 50 to about 100° C. or 50 to 100° C. (e.g., 50, 55, 60, 65, 70, 75, 80, 85, 90, 95 or 100° C.), preferably about 50 to about 80° C. or 50 to 80° C. (e.g., 50, 52, 54, 55, 56, 58, 60, 62, 64, 65, 66, 68, 70, 72, 74, 75, 76, 78, or 80° C.), and (ii) a melt temperature of about 200 to about 280° C. or 200 to 280° C. (e.g., 200, 205, 210, 215, 220, 225, 230, 235, 240, 245, 250, 255, 260, 265, 270, 275, or 280° C.), preferably about 210 to about 260° C. or 210 to 260° C. (e.g., 210, 215, 220, 225, 230, 235, 240, 245, 250, 255, or 260° C.). In preferred embodiments of the first-fourth embodiments, the thermoplastic polyester elastomer has both a Tg and a melt temperature within the preferred ranges or amounts discussed above. In particularly preferred embodiments of the first-fourth embodiments, the thermoplastic polyester elastomer has both a Tg and a melt temperature within the preferred ranges or amounts discussed above. Both the Tg and the melt temperature can be determined according to standard methods such as ISO 11357. Notably, the thermoplastic polyester elastomer material will generally have two Tgs and the foregoing Tg values should be understood as referring to the higher Tg from the curve.

Various thermoplastic polyester elastomers having the foregoing described properties may be used in preparing the temperature stable polymeric blend. One or more than one thermoplastic polyester elastomer may be utilized. In preferred embodiments, the thermoplastic polyester elastomer is a polyether-polyester block copolymer and in certain such embodiments, at least 90% by weight (e.g., 90%, 91%, 92%, 93%, 94%, 95%, 96%, 97%, 98%, 99%, or 100%), at least 95% by weight (e.g., 95%, 96%, 97%, 98%, 99%, or 100%), at least 98% (e.g., 98%, 98.5%, 99%, 99.5%, or 100%), at least 99% by weight or even 100% by weight of the thermoplastic polyester elastomer comprises a polyether-polyester block copolymer. A polyether-polyester block copolymer includes a "hard" portion in the form of polyester blocks (or polyester segments) that can be produced by the reaction of a dicarboxylic derivative (e.g., terephthalate or naphthalate) and one or more diols (e.g., butanediol, propanediol) and also includes a "soft" or elastomeric portion in the form of polyether blocks (or polyether segments) that can be based upon polyalkylene ether glycols. The relative amount of polyester blocks and polyether blocks can vary with the weight % of total units from the polyester blocks being 30 to 90% by weight (e.g., 30, 35, 40, 45, 50, 55, 60, 65, 70, 75, 80, 85, or 90% by weight) of the overall copolymer, preferably 30 to 40% by weight (e.g., 30, 32, 34, 35, 36, 38, or 40% by weight) of the overall copolymer and the weight % of total units from the polyether blocks being 10 to 70% by weight (e.g., 10, 20, 30, 40, 50, 60, or 70 weight %) of the overall copolymer, preferably 60 to 70% by weight (e.g., 60, 62, 64, 65, 66, 68, or 70 weight %) of the overall copolymer. Exemplary polyether-polyester block copolymers which are suitable for use include polyalkylene-terephthalate-polyalkylene ether glycol copolymers and polyalkylene-naphthalate-polyalkylene ether glycol copolymers, with polyalkylene terephthalate-polyalkylene ether glycol copolymers such as polybutylene terephthalate-polymethylene ether glycol being preferred. In certain embodiments, the polyalkylene ether glycol portion of the polyether-polyester block copolymer can be selected from the group consisting of polypropylene ether glycol, polytetramethylene ether glycol, polytrimethylene ether glycol, polymethylene ether glycol, and combinations thereof.

Various polyether-polyester block copolymers are commercially available and may be suitable for use as the thermoplastic polyester elastomer (a) in the polymeric blend, including, but not limited to various grades of Hytrel® (available from DuPont™), Riteflex® (available from Celanese Corporation), Arnitel® (available from DSM Engineering Plastics), Pelprene® (available from Toyobo U.S.A., Inc.). Suitable grades of the foregoing thermoplastic polyester elastomers can be selected using the other properties described herein (e.g., Tg and melt temperature). For example, under the Pelprene® brand from Toyobo, ultra heat-resistant S types or P-type with high flexibility and high melting point may be useful.

In certain embodiments of the first-fourth embodiments, the thermoplastic polyester elastomer has at least one of the following properties: (a) a Shore D hardness (as measured by ISO 868, 15 seconds) of 20-70 (e.g., 20, 25, 30, 35, 40, 45, 50, 55, 60, 65, or 70) or 30-60 (e.g., 30, 35, 40, 45, 50, 55, or 60), (b) a tear strength (as measured by ISO 150-34-1) of 70-130 kN/m (e.g., 70, 75, 80, 85, 90, 95, 100, 105, 110, 115, 120, 125, or 130 kN/m) or 75-125 kN/m (e.g., 75, 80, 85, 90, 95, 100, 105, 110, 115, 120, or 125 kN/m) in the parallel and/or 60-130 kN/m (e.g., 60, 65, 70, 75, 80, 85, 90, 95, 100, 105, 110, 115, 120, 125, or 130 kN/m) or 70-125 kN/m (e.g., 70, 75, 80, 85, 90, 95, 100, 105, 110, 115, 120, or 125 kN/m) in the normal, (c) a notched impact strength (as measured by ISO 179/1 eA) at 23° C. of at least 40 kJ/m$^2$, including 40-100 kJ/m$^2$ (e.g., 40, 45, 50, 55, 60, 65, 70, 75, 80, 85, 90, 95 or 100 kJ/m$^2$) and 50-90 kJ/m$^2$ (50, 55, 60, 65, 70, 75, 80, 85, or 90 kJ/m$^2$), (d) a flexural modulus (as measured by ISO 178) of 20-100 MPa (e.g., 20, 25, 30, 35, 40, 45, 50, 55, 60, 65, 70, 75, 80, 85, 90, 95 or 100 MPa) or 20-90 MPa (e.g., 20, 25, 30, 35, 40, 45, 50, 55, 60, 65, 70, 75, 80, 85, or 90 MPa), (e) a stress at break (as measured by ISO 527) of 20-40 MPa (e.g., 20, 25, 30, 35, or 40 MPa) or 22-38 MPa (e.g., 22, 24, 26, 28, 30, 32, 34, 36, or 38 MPa) or 24-36 MPa (e.g., 24, 26, 28, 30, 32, 34, or 36 MPa), or (f) a nominal strain at break (as measured by ISO 527) of at least 600% or 600-1000% (e.g., 600, 650, 700, 750, 800, 850, 900, 950, or 1000%) or 650-950% (e.g., 650, 700, 750, 800, 850, 900, or 950%) or 700-900% (e.g., 700, 750, 800, 850, or 900%). In certain embodiments of the first-fourth embodiments, each of the foregoing (a)-(c) are met. In certain embodiments of the first-fourth embodiments, each of the foregoing (a)-(c) are met and at least one of (d)-(f) are also met. In yet other embodiments of the first-fourth embodiments, each of (a)-(f) are met.

High Temperature Thermoplastic Polymer

As discussed above, a high temperature thermoplastic polymer (component (b)) is used in preparing the temperature stable polymeric blend. This polymer is referred to as being high temperature since both its Tg and its melt temperature (as discussed in more detail below) will be higher than the corresponding properties of the thermoplastic polyester elastomer (component (a)). The high temperature thermoplastic polymer allows the temperature stable polymeric blend to operate at a relatively higher temperature without significant loss of properties are compared to the use of the thermoplastic polyester elastomer alone. Suitable high temperature thermoplastic polymers for use in the blend will have at least one of (i) a Tg of about 200 to about 300° C. or 200 to 300° C. (e.g. 200, 210, 220, 230, 240, 250, 260, 270, 280, 290, or 300° C.), preferably about 200 to about 275° C. or 200 to 275° C. (e.g., 200, 205, 210, 215, 220, 225, 230, 235, 240, 245, 250, 255, 260, 265, 270, or 275° C.), or (ii) a melt temperature of about 300 to about 400° C. or 300 to 400° C. (e.g., 300, 310, 320, 330, 340, 350, 360, 370, 380, 390, or 400° C.), preferably about 320 to about 390° C. or 320 to 390° C. (e.g., 320, 325, 330, 335, 340, 345, 350, 355, 360, 365, 370, 375, 380, 385, or 390° C.). In preferred embodiments, the high temperature thermoplastic polymer has both a Tg and a melt temperature within one of the ranges or amounts discussed above. In particularly preferred embodiments, the high temperature thermoplastic polymer has both a Tg and a melt temperature within the preferred ranges or amounts discussed above. Both the Tg and the melt temperature can be determined according to standard methods such as ISO 11357.

Various high temperature thermoplastic polymers having the foregoing described properties may be used in preparing the temperature stable polymeric blend. One or more than one high temperature thermoplastic polymer may be utilized. In preferred embodiments, the high temperature thermoplastic polymer is a polysulfone polymer and in certain such embodiments, at least 90% by weight (e.g., 90%, 91%, 92%, 93%, 94%, 95%, 96%, 97%, 98%, 99% or 100%), at least 95% by weight (e.g., 95%, 96%, 97%, 98%, 99% or 100%), at least 98% (e.g., 98%, 99%, or 100%), at least 99% by weight (e.g., 99%, 99.5%, or 100%), or even 100% by weight of the high temperature thermoplastic polymer comprises a polysulfone polymer. In certain preferred embodiments of the first-fourth embodiments, 90-100%, 90-99%, 90-95%, 95-100%, or 95-99% by weight of the high temperature thermoplastic polymer comprises a polysulfone polymer. Particularly preferred polymers for the high temperature thermoplastic polymer include polyethersulphone polymers and polyphenylsulphone polymers.

Generally, a polyethersulfone polymer can be understood as having the following structure wherein each of the repeat units in parenthesis can be considered to have structure (I)

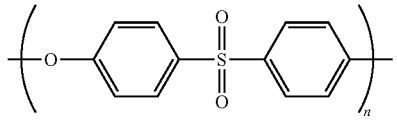

Notably each phenyl group (as indicated in structure (I) may alternatively be biphenyl, bisphenol A, or generally any other aryl group with aromatic or heteroaromatic structure), which can be represented as —[O—Ar—SO$_2$—Ar—]— where Ar is an aryl group of aromatic or heteroaromatic structure. The Mw of the polyethersulfone polymer may vary, but is generally about 20,000 to about 100,000 grams/mole or 20,000 to 100,000 grams/mole (e.g., 20,000; 30,000; 40,000; 50,000; 60,000; 70,000; 80,000; 90,000; or 100,000 grams/mole), preferably about 40,000 to about 80,000 grams/mole or 40,000 to 80,000 grams/mole (e.g., 40,000; 45,000; 50,000; 55,000; 60,000; 65,000; 70,000; 75,000; or 80,000 grams/mole), as determined by gel permeation chromatography using ASTM D5296 with polystyrene standards. In polyethersulphone polymers, each of the aromatic or heteroaromatic groups can optionally include one or more monovalent substituents (e.g., 1, 2, 3 or 4 substituents) which for each aromatic or heteroaromatic group are independently selected from the group consisting of a halogen, an alkyl, an alkenyl, an alkynyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. In certain embodiments, the polyethersulphone polymer includes at least 75% by weight (e.g., 75%, 80%, 85%, 90%, 95%, 99%, or 100% by weight) recurring units of structure (I) wherein the aromatic or heteroaromatic groups are unsubstituted, preferably in such embodiments, more than 90% by weight (e.g., 91%, 95%, 99%, 100% by weight) recurring units of structure (I) wherein the aromatic or heteroaromatic groups are unsubstituted, more than 99% by weight (e.g., 99.1%, 99.5%, or 100% by weight) or even 100% by weight recurring units of structure (I) wherein the aromatic or heteroaromatic groups are unsubstituted. In other embodiments, the polyethersulphone polymer includes at least 75% by weight (e.g., 75%, 80%, 85%, 90%, 95%, 99%, or 100% by weight) recurring units of structure (I) wherein the aromatic or heteroaromatic groups are substituted, preferably in such embodiments, more than 85% by weight (e.g., 86%, 90%, 95%, 99%, or 100% by weight) recurring units of structure (I) wherein the aromatic or heteroaromatic groups are substituted, more than 95% by weight (e.g., 96%, 96%, 97%, 98%, 99%, or 100% by weight), more than 99% by weight (e.g., 99.1%, 99.5%, or 100% by weight) or even 100% by weight recurring units of structure (I) wherein the aromatic or heteroaromatic groups are substituted.

Generally, a polyphenylethersulphone polymer can be understood as having the following structure wherein each of the repeat units in parenthesis can be considered to have structure (II)

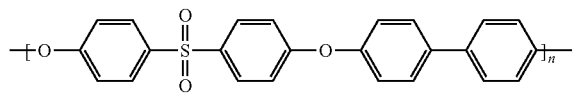

The Mw of such polyphenylethersulphone polymers may vary but is generally about 20,000 to about 100,000 grams/mole or 20,000 to 100,000 grams/mole (e.g., 20,000; 30,000; 40,000; 50,000; 60,000; 70,000; 80,000; 90,000; or 100,000 grams/mole), preferably about 40,000 to about 80,000 grams/mole or 40,000 to 80,000 grams/mole (e.g., 40,000; 45,000; 50,000; 55,000; 60,000; 65,000; 70,000; 75,000; or 80,000 grams/mole), as determined by gel permeation chromatography using ASTM D5296 with polystyrene standards. In polyphenylethersulphone polymers, each of the phenyl groups can optionally include one or more monovalent substituents (e.g., 1, 2, 3 or 4 substituents) which for each phenyl group are independently selected from the group consisting of a halogen (e.g., chlorine, bromine, iodine, or fluorine), an alkyl, an alkenyl, an alkynyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium. In certain embodiments, the polyethersulfone polymer includes at least 75% by weight (e.g., 75%, 80%, 85%, 90%, 95%, 99%, or 100% by weight) recurring units of structure (I) wherein the phenyl groups are unsubstituted, preferably in such embodiments, more than 90% by weight (e.g., 91%, 95%, 99%, or 100% by weight) recurring units of structure (I) wherein the phenyl groups are unsubstituted, more than 99% by weight (e.g., 99.1%, 99.5%, or 100% by weight) or even 100% by weight recurring units of structure (I) wherein the phenyl groups are unsubstituted. In other preferred embodiments, the polyethersulphone polymer includes at least 75% by weight (e.g., 75%, 80%, 85%, 90%, 95%, 99%, or 100% by weight)

recurring units of structure (I) wherein the phenyl groups are substituted, preferably in such embodiments, more than 85% by weight (e.g., 86%, 90%, 95%, 99%, or 100% by weight) recurring units of structure (I) wherein the phenyl groups are substituted, more than 95% by weight (e.g., 96%, 97%, 98%, 99%, or 100% by weight), more than 99% by weight (e.g., 99.1%, 99.5%, or 100% by weight) or even 100% by weight recurring units of structure (I) wherein the phenyl groups are substituted.

Various polyethersulfone polymers are commercially available and may be suitable for use as the high temperature thermoplastic polymer (b) in the polymeric blend, including, but not limited to various grades of Veradel® (available from Solvay™), LNP™ including LNP™ THERMO-COMP™ and LNP™ LUBRICOMP™ (available from SABIC), Ultrason® E (available from BASF), RTP 1400 series (available from RTP Company), and LUVOCOM® (available from Lehmann & Voss). Various polyphenylsulfone polymers are also commercially available and may be suitable for use as the high temperature thermoplastic polymer (b) in the polymeric blend, including, but not limited to various grades of Accudel®, Radel® and Veriva® (all available from Solvay™), Ultrason® P (available from BASF), Europlex® (available from Evonik), and Sustason® (available from Rochling). Suitable grades of the foregoing high temperature thermoplastic polymers can be selected using the other properties described herein (e.g., Tg and melt temperature).

In certain embodiments of the first-fourth embodiments, the high temperature thermoplastic polymer (b) has a Mn of about 8,000 to about 120,000 grams/mole or 8,000 to 120,000 grams/mole (e.g., 8,000; 10,000; 20,000; 30,000; 40,000; 50,000; 60,000; 70,000; 80,000; 90,000; 100,000; 110,000; or 120,000 grams/mole), preferably about 15,000 to about 90,000 grams/mole or 15,000 to 90,000 grams/mole (e.g., 15,000; 20,000; 30,000; 40,000; 50,000; 60,000; 70,000; 80,000; or 90,000 grams/mole), more preferably about 20,000 to about 55,000 grams/mole or 20,000 to 55,000 grams/mole (e.g., 20,000; 25,000; 30,000; 35,000; 40,000; 45,000; 50,000; or 55,000 grams/mole); in certain such embodiments the high temperature thermoplastic polymer (b) is a polyethersulfone polymer, preferably a polyphenylethersulphone polymer. In certain embodiments of the first-fourth embodiments, the high temperature thermoplastic polymer (b) has a Mw of about 20,000 to about 350,000 grams/mole or 20,000 to 350,000 grams/mole (e.g., 20,000; 30,000; 40,000; 50,000; 100,000; 150,000; 200,000; 250,000; 300,000; or 350,000 grams/mole), preferably about 50,000 to about 250,000 grams/mole or 50,000 to 250,000 grams/mole (e.g., 50,000; 100,000; 150,000; 200,000; or 250,000 grams/mole), more preferably about 60,000 to about 150,000 grams/mole or 60,000 to 150,000 grams/mole (e.g., 60,000; 70,000; 80,000; 90,000; 100,000; 110,000; 120,000; 130,000; 140,000; or 150,000 grams/mole); in certain such embodiments the high temperature thermoplastic polymer (b) is a polyethersulfone polymer, preferably a polyphenylethersulphone polymer. In certain embodiments of the first-fourth embodiments, the high temperature thermoplastic polymer (b) has a Mw/Mn of about 1.5 to about 4 or 1.5 to 4 (e.g., 1.5, 2, 2.5, 3, 3.5, or 4), preferably about 1.9 to about 3.8 or 1.9 to 3.8 (e.g., 1.9, 2, 2.1, 2.3, 2.5, 2.7, 2.9, 3, 3.1, 3.3, 3.5, 3.7, or 3.8), more preferably about 2 to about 3.5 or 2 to 3.5 (e.g., 2, 2.1, 2.2, 2.3, 2.4, 2.5, 2.6, 2.7, 2.8, 2.9, 3, 3.1, 3.2, 3.3, 3.4, 3.5, 3.6, 3.7, or 3.8); in certain such embodiments the high temperature thermoplastic polymer (b) is a polyethersulfone polymer, preferably a polyphenylethersulphone polymer. In preferred embodiments of the first-fourth embodiments, the high temperature thermoplastic polymer (b) has a Mw, Mn and Mw/Mn within the foregoing ranges, preferably within the foregoing preferred ranges, and more preferably within the foregoing more preferred ranges; in certain such embodiments the high temperature thermoplastic polymer (b) is a polyethersulfone polymer, preferably a polyphenylethersulphone polymer. The Mw and Mn values for the high temperature thermoplastic polymer can be determined by GPC using a polystyrene standard.

Compatibilizer Resin

As discussed above, a compatibilizer resin (component (c)) is used in preparing the temperature stable polymeric blend. The compatibilizer resin can be useful in achieving more homogenous mixing or blending of the thermoplastic polyester elastomer (component (a)) with the high temperature thermoplastic polymer (component (b)) and allows the mixture of the two to be processed at a lower temperature than would otherwise be required for the high temperature thermoplastic polymer.

Various types of resins can be used as the compatibilizer resin in preparing the temperature stable polymeric blend. In preferred embodiments, the compatibilizer resin is a phenoxy resin and in certain such embodiments, at least 90% (e.g., 90%, 91%, 92%, 93%, 94%, 95%, 96%, 97%, 98%, 99%, or 100%), at least 95% (e.g., 95%, 96%, 97%, 98%, 99%, or 100%), at least 98% (e.g., 98%, 99%, or 100%), at least 99% (e.g., 99%, 99.5%, or 100%) or even 100% by weight of the compatibilizer resin comprises a phenoxy resin. Generally, phenoxy resins may be prepared from bisphenol A and an epoxy such as epichlorohydrin. Generally, a phenoxy resin can be understood as having the following structure wherein each of the repeat units in parenthesis can be considered to have structure (II)

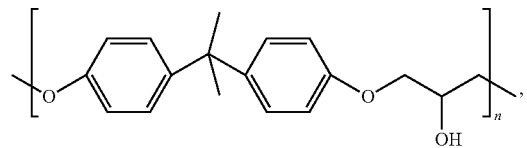

where n is about 50 to about 250 (e.g., 50, 75, 100, 125, 150, 175, 200, 225, or 250). The Mw of the compatibilizer resin may vary, although a Mw of about 15,000 to about 60,000 grams/mole or 15,000 to 60,000 grams/mole (e.g., 15,000; 20,000; 25,000; 30,000; 35,000; 40,000; 45,000; 50,000; 55,000; or 60,000 grams/mole) is preferred with a Mw of about 20,000 to about 50,000 grams/mole or 20,000 to 50,000 grams/mole (e.g., 20,000; 25,000; 30,000; 35,000; 40,000; 45,000; or 50,000 grams/mole) being particularly preferred. The foregoing Mw ranges should be understood to apply equally to the use of the preferred phenoxy resin(s) as the compatibilizer resin. In certain embodiments of the first-fourth embodiments, the compatibilizer resin will be a solid at room temperature and will be used in solid form (e.g., pellets or powder, preferably pellets) in preparing the temperature stable polymeric blend (rather than in solution). The amount of compatibilizer resin that is used to prepare the temperature stable polymeric blend may vary. As mentioned above, preferably the compatibilizer resin is used in an amount of about 5 to about 20% (based upon the total weight of (a) and (b)), more preferably in an amount of about 8 to about 15% (based upon the total weight of (a) and (b)). By stating that the amount of compatibilizer resin is within one of the foregoing ranges in an amount by weight based upon the total weight of (a) and (b) is meant that the total amount of (a) and (b) is set at 100 parts and the amount of compatibilizer resin is calculated accordingly. As a non-limiting example, the use of 5% by weight compatibilizer resin, based upon the total weight of (a) and (b) can be understood as equating to 5 parts of compatibilizer resin with a total amount of 100 parts of (a) and (b). In certain embodiments, the phenoxy resin may be functionalized in that the phenoxy resin can include (e.g. at a terminal group) at least one of an epoxy group, a hydroxyl group, an amine group, a fluorine group, a siloxane group, and/or amide group.

Various phenoxy resins are commercially available and may be suitable for use as the compatibilizer resin (c) in the polymeric blend, including, but not limited to various grades of solid grades from InChem Corp. (sold under the PhenoxyVeradel® (available from Solvay™) such as PKHA, PKHB, PKHB+PKHC, PKHH, PKHJ, PKFE, PKHP and PKHB; YP50S from Nippon Steel & Sumikin Chemical Co., Ltd.; and jER™ (formerly Epikote™) from Mitsubishi Chemical.

Delayed Crosslinking Agent

As discussed above, a delayed crosslinking agent (component (d)) is used in preparing the temperature stable polymeric blend. The use of a delayed crosslinking agent (as opposed to an ordinary crosslinking agent) provides the benefit of delaying crosslinking of the blend until after the blend has been molded (e.g., by injection molding), thereby creating a thermoset article having performance advantages over a thermoplastic article, especially for use as a tire component such as in a non-pneumatic tire (e.g., as spokes).

Various types of compounds can be utilized as the delayed crosslinking agent when preparing the temperature stable polymeric blend. In preferred embodiments, the delayed crosslinking agent is an epoxy compound. Various epoxy compounds may be suitable for use as the delayed crosslinking agent when preparing the temperature stable polymeric blend. Particularly preferred types of epoxies are epoxidized plant oils and poly-epoxide compounds.

Generally, a poly-epoxide compound can be understood as including co- and ter-polymers which incorporate more than one epoxy functionality. A poly-epoxide compound which includes more than one epoxy functionality can also be described as including multiple mers of epoxy-containing monomers. More specifically, suitable poly-epoxide copolymers include an epoxy monomer such as glycidyl or phenyl glycidyl and a second monomer such as an isocyanate or an aldehyde. Suitable poly-epoxide terpolymers include an epoxy monomer such as glycidyl or phenyl glycidyl and a second and third monomer such as an isocyanate, aldehyde, aromatic amine, (meth)acrylate, or cresol. Non-limiting examples of suitable poly-epoxide compounds suitable for use as the delayed crosslinking agent include poly(ethylene-co-methyl acrylate-co-glycidyl methacrylate), poly(ethylene-co-glycidyl methacrylate), poly[(o-cresyl glycidyl ether)-co-formaldehyde), poly[(phenyl glycidyl ether)-co-formaldehyde), N,N-diglycidyl-4-glycidyloxyaniline, triglycidyl isocyanurate, and combinations thereof.

In certain embodiments of the first-fourth embodiments, when the delayed crosslinking agent is a poly-epoxide compound it is selected from one or more types of epoxy resins, more specifically from the group consisting of glycidyl epoxy resins, non-glycidyl epoxy resins, and combinations thereof. In certain embodiments of the first-fourth embodiments, the delayed crosslinking agent comprises a glycidyl epoxy resin; in certain such embodiments, the delayed crosslinking agent consists of a glycidyl epoxy resin. In certain embodiments of the first-fourth embodiments, the delayed crosslinking agent comprises a non-glycidyl epoxy resin; in certain such embodiments, the delayed crosslinking agent consists of a non-glycidyl epoxy resin. Exemplary types of glycidyl epoxy resins include glycidoxy-ethers (e.g., glycidyl ether of bisphenol A and novolac epoxy resins), glycidoxy-esters, and glycidoxy-amines. In certain embodiments of the first-fourth embodiments, the delayed crosslinking agent comprises a glycidoxy-ether resin; in certain such embodiments, the delayed crosslinking agent consists of a glycidoxy-ether resin. Exemplary types of non-glycidyl epoxy resins include aliphatic epoxy resins and cycloaliphatic resins.

When the delayed crosslinking agent is an epoxidized plant oil, various plant oils may serve as the base oil. More specifically, suitable epoxidized plant oils include, but are not limited to, epoxidized soybean oil, epoxidized linseed oil, epoxidized sunflower oil, epoxidized safflower oil, epoxidized olive oil, epoxidized canola oil, epoxidized corn oil, epoxidized flaxseed oil, epoxidized castor oil, epoxidized sesame oil, epoxidized cashew nut oil, epoxidized macadamia nut oil, epoxidized cottonseed oil, epoxidized jojoba oil, epoxidized palm oil, epoxidized coconut oil, epoxidized palm oil, epoxidized tung oil, epoxidized, epoxidized peanut oil. Alternatively, an epoxidized form of an animal sourced oil such as lard could be utilized. Preferably, when the epoxide compound is an epoxidized plant oil epoxidized soybean oil or epoxidized linseed oil are used, each of which are generally available from various suppliers.

Activator

As discussed above, an activator (component (e)) is used in preparing the temperature stable polymeric blend. The use of an activator can be beneficial in lowering the activation energy required for the reactions which lead to hardening of the blend into a thermoset article. Because of the role of the activator in hardening the temperature stable polymeric blend, an activator is sometimes referred to as hardener.

Various types of compounds can be utilized as the activator when preparing the temperature stable polymeric blend. Non-limiting examples of compounds suitable for use as the activator include amine-based compounds, carboxylic acid compounds, thiol compounds, anhydrides, and phenol compounds. Preferably, the activator is an amine-based compound.

According to the first-fourth embodiments, when an amine-based compound is used as the activator, various types of compounds may be suitable including aliphatic, alicyclic, and aromatic amines, including diamines, polyamines and amides. Preferably, the amine-based compound is an aliphatic amine, more preferably a primary or secondary aliphatic amine. More specifically, suitable aliphatic amines can include compounds such as ethylenediamine, hexamethylenediamine, methylpentamethylenediamine, N—N-dimethylpropylenediamine, N—N-diethylpropylenediamine, ethylenetriamine, diethylenetriamine, triethylenetetramine, tetraethylenepentamine, trimethylhexamethylenediamine, dipropenediamine, diethylaminopropylamine, and combinations thereof. Suitable alicyclic amines can include compounds such as N-aminoethylpiperazine, piperidine, menthane diamine, 1,2-diaminocyclohexane, 1,4-diaminocyclohexane, bis(4-aminocyclohexyl)methane, bis(3,5-methyl-4-aminocyclohexyl)metha ne, bis(3,5-methyl-4-aminocyclohexyl)metha ne; 2,4-bis(4-aminocyclohexylmethyl)cyclohexylamine; 2,2-bis(4-aminocyclohexyl)propa ne; 4,4'-bis(4-cyclohexylmethyl)dicyclohexylamine; 2,2-bis(4-amino-3-methylcylohexyl)propane; 3-aminomethyl-3,5,5-trimethylcyclohexylamine (isophorone diamine); 1,4-bis(aminomethyl)cyclohexane; 1,3-bis(aminomethyl)cyclohexane; bicyclo[2.2.1]heptanebis(methylamine) (norbornane diamine); 3,3,5-trimethyl-N-(propan-2-yl)-5-[(propan-2-ylamino)methyl]cyclohexylamine, isophoronediamine, and combinations thereof. Suitable aromatic amines can include compounds such as m-xylylenediamine, p-xylylenediamine, metaphenylene diamine, diaminodiphenylmethane, benzyldimethylamine, tris-2,4,6-dimethylaminomethylphenol, diaminodiphenylsulfone, and combinations thereof.

When a phenol compound is used as the activator, various types of compounds may be suitable including cresols, bisphenol A, t-butyl phenol, nonylphenol, and novolacs. More specific examples include, but are not limited to, phenol-formaldehyde novolac resin, cresol-formaldehyde novolac resin, bisphenol A phenol-formaldehyde novolac resin, dicyandiamide, dicyclopentadiene-phenol resin, dicyclopentadiene-phenol-novolac resin, and combinations thereof.

When a carboxylic acid compound is used as the activator, various types of compounds may be suitable including carboxylic acids and metal salts of $C_8$-$C_{24}$ (e.g., $C_8$, $C_9$, $C_{10}$), $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, or $C_{24}$) carboxylic acids (e.g., with the metal being Ba, Cd, Ca, Ce, Cu, Fe, La, Pb, Mn, Na, Zn, or Zr).

When a thiol compound is used as the activator, various types of compounds may be suitable including aliphatic thiol compounds, aromatic thiol compounds, heterocyclic-ring containing thiol compounds, and compounds with mercapto groups (particularly those containing at least two mercapto groups). More specifically, suitable aliphatic thiol compounds include methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris($\beta$-thiopropionate), tris-mercaptan derivative of tri-glycidyl ether of propoxylated alkane, and dipentaerythritol poly($\beta$-thiopropionate); halogen-substituted derivatives of the aliphatic thiols, and combinations thereof. Suitable aromatic thiol compounds include di-, tris- or tetra-mercaptobenzene; bis-, tris- or tetra-(mercaptoalkyl)benzene; dimercaptobiphenyl; toluenedithiol; naphthalenedithiol; halogen-substituted derivatives of the aromatic thiols, and combinations thereof. Suitable heterocyclic-ring containing thiol compounds include amino-4,6-dithiol-sym-triazine, alkoxy-4,6-dithiol-sym-triazine, aryloxy-4,6-dithiol-sym-triazine, 1,3,5-tris(3-mercaptopropyl) isocyanurate, halogen-substituted derivatives of the heterocyclic ring-containing thiols, and combinations thereof. Suitable thiol compounds containing mercapto groups include bis-, tris- or tetra(mercaptoalkylthio)benzene; bis-, tris- or tetra(mercaptoalkylthio)alkane; bis(mercaptoalkyl) disulfide; hydroxyalkylsulfidebis(mercaptopropionate); hydroxyalkylsulfidebis(mercaptoacetate); mercaptoethyl ether bis(mercaptopropionate); 1,4-dithian-2,5-diolbis(mercaptoacetate); thiodiglycolic acid bis(mercaptoalkyl ester); thiodipropionic acid bis(2-mercaptoalkyl ester); 4,4-thiobutyric acid bis(2-mercaptoalkyl ester); 3,4-thiophenedithiol; bismuththiol; 2,5-dimercapto-1,3,4-thiadiazol; and combinations thereof. In certain preferred embodiments of the first-fourth embodiments, when the activator is a thiol compound a primary thiol (or terminal thiol) compound is utilized.

When an anhydride compound is used as the activator, various types of compounds may be suitable including acid anhydrides which includes aromatic anhydrides, alicyclic anhydrides, and aliphatic anhydrides. More specifically, suitable acid anhydrides include phthalic anhydride, trimellitic anhydride, pyromellitic anhydride, benzophenone tricarboxylic anhydride, ethylene glycol bistrimellitate, glycerol tristrimellitate, maleic anhydride, citric acid anhydride, tetrahydrophthalic anhydride, methyletrrahydrophthalic anhydride, endomethylene tetrahydrophthalic anhydride, methylenedomethylene tetrahydrophthalic anhydride, methylbutenyl tetrahydrophthalic anhydride, dodecendyl succinic anhydride, nonenyl succinic ahyrdide, nadic anhydride, methyl nadic anhydride, hexahydrophthalic anhydride, hexahydro-4-methylphthalic anhydride, succinic anhydride, methylcyclohexene dicarboxylic anhydride, alkylstyrene-maleic anhydride copolymer, chlorendic anhydride, polyazelaic polyanhydride, and combinations thereof. More specifically, suitable alicyclic anhydrides include methyltetrahydrophthalic anhydride, tetrahydrophthalic anhydride, methylnadic anhydride, hexahydrophthalic anhydride, methylhexahydrophthalic anhydride, the other alicyclic anhydrides mentioned above, and combinations thereof. Suitable aliphatic anhydrides include compounds such as polysebacic acid polyanhydride, polyazelaic acid polyanhydride, propionic acid anhydride, acetic acid ahyrdide, butyric acid anhydride, any other aliphatic anhydrides mentioned above, and combinations thereof. Suitable aromatic anhydrides include phthalic anhydride, trimellitic anhydride, any other aromatic anhydrides mentioned above, and combinations thereof.

Properties of the Temperature Stable Polymeric Blend

According to the first-fourth embodiments, the properties of the temperature stable polymeric blend may vary. In certain embodiments of the first-fourth embodiments, the temperature stable polymeric blend will meet at least one of the following: (a) a maximum stress (also referred to as stress at break or Tb) of at least 10 MPa (e.g., 10, 11, 12, 13, 14, 15, 16, 17, 18, 19, 20, 25, 30, 35, 40, 45, 50 MPa or higher), preferably at least 11 MPa (e.g., 11, 12, 13, 14, 15, 16, 17, 18, 19, 20, 25, 30, 35, 40, 45, 50 MPa or higher) or at least 12 MPa (e.g., 12, 13, 14, 15, 16, 17, 18, 19, 20, 25, 30, 35, 40, 45, 50 MPa or higher), (b) an elongation at break (also referred to as Eb) of at least 90% (e.g., 90%, 95%, 100%, 105%, 110%, 120%, 130%, 150%, 160%, 170%, 180%, 190%, 200%, 210%, 220%, 230%, 240%, 250%, 260%, 270%, 280%, 290%, 300% or more), preferably at least 100% (e.g., 90%, 95%, 100%, 105%, 110%, 120%, 130%, 150%, 160%, 170%, 180%, 190%, 200%, 210%, 220%, 230%, 240%, 250%, 260%, 270%, 280%, 290%, 300% or more), (c) M50 of at least 10 MPa (e.g., 10, 11, 12, 13, 14, 15, 16, 17, 18, 19, 20 MPa or higher), preferably at least 11 MPa (e.g., 11, 12, 13, 14, 15, 16, 17, 18, 19, 20 MPa or higher) or at least 12 MPa (e.g., 12, 13, 14, 15, 16, 17, 18, 19, 20 MPa or higher), (d) M100 of at least 10 MPa (e.g., 10, 11, 12, 13, 14, 15, 16, 17, 18, 19, 20, 21, 22, 23, 24, 25 MPa or higher), preferably at least 11 MPa (e.g., 11, 12, 13, 14, 15, 16, 17, 18, 19, 20, 21, 22, 23, 24, 25 MPa or higher) or at least 12 MPa (e.g., 12, 13, 14, 15, 16, 17, 18, 19, 20, 21, 22, 23, 24, 25 MPa or higher), or (e) a toughness (measured as the integral of area under the curve at tensile rupture with x axis in mm/mm) of at least 8 MPa % (e.g., 8, 9, 10, 11, 12, 13, 14, 15, 16, 17, 18, 19, 20, 25, 30, 35, 40, 45, 50, 55, 60, 65, 70, 75, 80, 85 90 MPa % or higher), preferably at least 9 MPa % (e.g., 9, 10, 11, 12, 13, 14, 15, 16, 17, 18, 19, 20, 25, 30, 35, 40, 45, 50, 55, 60, 65, 70, 75, 80, 85, 90 MPa % or higher) or at least 10 MPa % (e.g., 10, 11, 12, 13, 14, 15, 16, 17, 18, 19, 20, 25, 30, 35, 40, 45, 50, 55, 60, 65, 70, 75, 80, 85, 90 MPa % or higher). Measurements of Eb and Tb provide an indication of a rubber composition's tear resistance, which is particularly relevant when it is incorporated into a tire component. The abbreviation M50 is used for tensile stress at 50% elongation and the abbreviation M100 is used for tensile stress at 100% elongation. These values are sometimes referred to as modulus at 50% and modulus at 100%, although they do not represent true modulus measurements. Toughness refers to the ability of a material to withstand or resist fracturing. The foregoing properties (i.e., Eb, Tb, M50, M100, toughness) can be determined using the standard procedure described in ASTM D-412. Specimens are strained at a constant rate (of 20% per second) and the resulting force is recorded as a function of extension (strain). Properties are determined with testing at 23° C. (room temperature). Samples may be cured for 8-16 hours at an elevated temperature (between about 105 and 155° C.). After curing, samples for room temperature testing may be conditioned by allowing them to sit in the lab for at least 24 hours at room temperature before performing room temperature testing.

In certain embodiments of the first-fourth embodiments, the temperature stable polymeric blend exhibits at least one of the following: (a) a ratio of log storage modulus G' at 175° C. to log storage modulus G' at −40° C. that is no less than 1:150 (e.g., 1:150, 1:140, 1:130, 1:120, 1:110, 1:100, 1:90, 1:80, 1:70; 1:60; 1:50; 1:40, 1:30, 1:20, 1:10, 1:5, or more), preferably no less than 1:100 (e.g., 1:100, 1:90, 1:80, 1:70; 1:60; 1:50; 1:40, 1:30, 1:20, 1:10, 1:5, or more), more preferably no less than 1:20 (e.g., 1:20, 1:19, 1:18, 1:17, 1:16, 1:15, 1:14, 1:13, 1:12, 1:11, 1:10, 1:9, 1:8, 1:7, 1:6, 1:5, 1:4, 1:3, 1:2, or more), or (b) a strain-controlled cyclic fatigue performance of maintaining at least 95% of its tensile strength (e.g., 95%, 95.5%, 96%, 96.5%, 97%, 97.5%, 98%, 98.5%, 99%, 99.5%, or more) for at least 100 million cycles (this performance can be measured by cyclic loading between positive (15%) tension and negative (15%) compression at a frequency of 10 Hz at 25° C., where the tensile strength is the force in Newtons required to maintain the strain). In certain embodiments of the first-fourth embodiments, the ratio of log storage modulus G' at 175° C. to log storage modulus G' at −40° C. is 1:150 to 1:10 or 1:150 to 1:5, preferably 1:100 to 1:5, more preferably 1:20 to 1:5. Notably, the foregoing ratios are described as "no less than" since they can be understood as becoming more preferred the closer they are to the ratio of 1:1 which would indicate a blend with no change in log storage modulus G' over the indicated temperature range. In certain embodiments of the first-fourth embodiments, the strain-controlled cyclic fatigue performance is maintained at 95-99%, 95-98%, 95-97%, 96-99%, 96-98%, or 96-97%, according to the conditions described above. In preferred embodiments of the first-fourth embodiments, both of (a) and (b) are met, preferably with the preferred range for (a), more preferably with the more preferred range for (a). The ratio of log storage modulus G' can be measured according to ASTM D5279-13. The strain-controlled cyclic fatigue performance can be measured using the guidance of ASTM E606/E606M-12.

Processes for Preparing the Temperature Stable Polymeric Blend

As mentioned above, the second embodiment disclosed herein is directed to a process for preparing a temperature stable polymeric blend. Generally, the process includes heating a high temperature thermoplastic polymer to melt the polymer, and mixing (i) a thermoplastic polyester elastomer, (ii) a compatibilizer resin, (iii) a delayed crosslinking agent, and (iv) optionally an activator, with the melted polymer to form a blend. The high temperature thermoplastic polymer and other components are as described above. In preferred embodiments of the second embodiment, each of the foregoing steps occur in an extruder, more preferably a twin-screw extruder. Generally, the high temperature thermoplastic polymer, thermoplastic polyester elastomer, compatibilizer resin, delayed crosslinking agent, and activator that are used in the process of the second embodiment are as discussed above. In other words, each of the options discussed above for these components with respect to the first embodiment should be understood to apply to the process of the second embodiment as if fully set forth herein. In preferred embodiments of the process of the second embodiment, the high temperature thermoplastic polymer and the thermoplastic polyester elastomer are each provided in pellet form. Additionally, in preferred embodiments of the process of the second embodiment, each of the compatibilizer resin, delayed crosslinking agent, and activator are provided in pellet or other solid form. As mentioned above, the first embodiment disclosed herein is directed to a temperature stable polymeric blend. The temperature stable polymeric blend of the first embodiment may be prepared by a process according to the second embodiment as discussed generally herein or may be prepared by a process that differs from the process of the second embodiment. In other words, the temperature stable polymeric blend of the first embodiment should not be considered to be limited to only a blend prepared by the process of the second embodiment.

Generally, according to the process of the second embodiment and preferably when preparing the temperature stable polymeric blend of the first embodiment, the high temperature thermoplastic polymer should be melted (e.g., by heating) prior to addition of the thermoplastic polyester elastomer. As discussed previously, the high temperature thermoplastic polymer has a melt temperature which is higher than the melt temperature of the thermoplastic polyester elastomer. Preferably, the high temperature thermoplastic polymer will be added to a vessel or other mixing apparatus and heat applied to effect melting of the polymer. In certain embodiments of the process of the second embodiment, the heating and melting of the high temperature thermoplastic polymer takes place in an extruder, preferably a twin-screw extruder. As previously mentioned, in preferred embodiments of the process of the second embodiment, the mixing of the thermoplastic polyester elastomer, compatibilizer resin, delayed crosslinking agent, and activator with the high temperature thermoplastic polymer takes place in an extruder, more preferably a twin-screw extruder. In certain such embodiments, the twin-screw extruder that is utilized contains more than one heating zone (e.g., 2, 3, 4, 5, 6, etc.) which can be set at different temperatures for different steps of the process. Preferably, once the thermoplastic polyester elastomer (and other components) has been added to the melted high temperature thermoplastic polymer, shear is applied to the mixture to assist in producing a blend (e.g., by use of a twin-screw extruder). In preferred embodiments of the second embodiment, the high temperature thermoplastic polymer is heated to 300 to 400° C. (e.g., 300, 310, 320, 330, 340, 350, 360, 370, 380, 390, or 400° C.), preferably 320 to 350° C. (e.g., 320, 325, 330, 335, 340, 345, or 350° C.). In certain embodiments of the second embodiment, the high temperature thermoplastic polymer is heated to a temperature of 50 to 100° C. above (e.g., 50, 55, 60, 65, 70, 75, 80, 85, 90, 95, or 100° C. above) its melt temperature to effect melting. In certain embodiments of the process of the second embodiment, the high temperature thermoplastic polymer is melted prior to application of any shear. In other embodiments of the process of the second embodiment, shear mixing can be applied to the high temperature thermoplastic polymer during the melting process.

As discussed above, according to the process of the second embodiment, the thermoplastic polyester resin is mixed with the melted high temperature thermoplastic polymer. In certain embodiments of the second embodiment, the melted high temperature thermoplastic polymer is cooled by at least 100° C. (e.g., 100, 110, 120, 130, 140, 150, 160, 170, 180, 190, 200, 210, 220, 230, 240, 250, 260, 270, 280, 290, or 300° C.) prior to addition of the thermoplastic polyester resin, preferably cooled by about 125 to about 200° C. or 125 to 200° C. (e.g., 125, 135, 145, 155, 165, 175, 185, 195, or 200° C.) prior to addition of the thermoplastic polyester resin; according to such embodiments, the melted high temperature thermoplastic polymer may be at a temperature of no more than about 275° C. (e.g., 275, 265, 255, 245, 235, 225, 215, 205, 195, 185, 175° C. or less), no more than 250° C. (e.g., 250, 240, 230, 220, 210, 200, 190, 180, 170, 160° C. or less), no more than 225° C. (e.g., 225, 215, 205, 195, 185, 175, 165° C. or less) prior to mixing with the thermoplastic polyester resin. Such cooling can be beneficial in avoiding damage to the thermoplastic polyester resin and in achieving a more homogeneous mixture. In other embodiments of the process of the second embodiment, the melted high temperature thermoplastic polymer is not cooled prior to addition of the thermoplastic polyester resin but instead the addition of the thermoplastic polyester resin functions to cool the melted high temperature thermoplastic polymer. In certain embodiments of the process of the second embodiment, the thermoplastic polyester resin is itself melted prior to addition to the melted high temperature thermoplastic polymer. In other embodiments of the process of the second embodiment, the thermoplastic polyester resin is in solid form (e.g., pellets) when it is added to the melted high temperature thermoplastic polymer. According to the process of the second embodiment, the compatibilizer resin may be added with the thermoplastic polyester elastomer to the melted high temperature thermoplastic polymer or may be pre-mixed with the thermoplastic polyester elastomer prior to addition of the mixture to the melted high temperature thermoplastic polymer. Alternatively, the compatibilizer resin may be added to the melted high temperature thermoplastic polymer shortly after addition of the thermoplastic polyester elastomer (preferably within no more than 10 minutes, more preferably no more than 5 minutes or even within 1 minute). In those embodiments of the second embodiment wherein the compatibilizer resin is added to the melted high temperature thermoplastic polymer commensurate with or along with the thermoplastic polyester elastomer, each component may be separate (e.g., each component is present in its own pellet or other solid form) or the compatibilizer resin and thermoplastic polyester elastomer may be pre-mixed (e.g., melted together and re-pelletized or powdered).

According to the process of the second embodiment and optionally when preparing the temperature stable polymeric blend of the first embodiment, the delayed crosslinking agent may be added prior to, with, or pre-mixed with the thermoplastic polyester elastomer to the melted high temperature thermoplastic polymer. In preferred embodiments of the second embodiment, the melted high temperature thermoplastic polymer is cooled by at least 100° C. prior to addition of the delayed crosslinking agent, preferably cooled by about 125 to about 200° C. prior to addition of the delayed crosslinking agent. In those embodiments of the first-fourth embodiment wherein the delayed crosslinking agent has a melting point that is less than about 100° C. (which is usual for most, but not necessarily all, of the delayed crosslinking agents), the delayed crosslinking agent is preferably added with or pre-mixed with the thermoplastic polyester resin for addition to the melted high temperature thermoplastic polymer. Generally, the delayed crosslinking may be added to the melted high temperature thermoplastic polymer prior to addition of the thermoplastic polyester elastomer, commensurate with addition of the thermoplastic polyester elastomer, or shortly after addition of the thermoplastic polyester elastomer (preferably within no more than 10 minutes, more preferably no more than 5 minutes or even within 1 minute). In those embodiments of the process of second embodiment wherein the compatibilizer resin is added to the melted high temperature thermoplastic polymer commensurate with addition of the thermoplastic polyester elastomer, each component may be separate (e.g., each component is present in its own pellet or other form or the delayed cross-linking agent and thermoplastic polyester elastomer may be pre-mixed (e.g., melted together and re-pelletized or powdered) before being added to the melted high temperature thermoplastic polymer. In certain embodiments of the second embodiment, each of the thermoplastic polyester elastomer, compatibilizer resin, delayed crosslinking agent, and activator are added together or commensurate in time with each other, but in separate form (e.g., each component is present in its own pellet or powder form), to the melted high temperature thermoplastic polymer. In preferred embodiments of the second embodiment wherein the mixing takes place in an extruder, addition of the compatibilizer resin and the activator is delayed to a later portion of the extruder (e.g., occurs via a port in the last 20% of the length of the barrel of the extruder). Alternatively, embodiments of the second embodiment are specifically envisioned wherein each of the compatibilizer resin and the activator are separately compounded with portions of the high temperature thermoplastic polymer, thermoplastic polyester elastomer and delayed crosslinking agent and pelletized, with the pellets of each then being mixed and injection molded.

According to the process of the second embodiment and optionally when preparing the temperature stable polymeric blend of the first embodiment, the activator is mixed with the high temperature thermoplastic polymer (either along with its addition to a vessel or after melting of the polymer) or the activator may be added prior to, with, or pre-mixed with the thermoplastic polyester elastomer to the melted high temperature thermoplastic polymer.

In certain embodiments of the process of the second embodiment, once the high temperature thermoplastic polymer, thermoplastic polyester elastomer, compatibilizer resin, delayed crosslinking agent and activator have been mixed to produce a blend, the blend is extruded, preferably to produce pellets of the temperature stable polymeric blend. An extruder that is fitted with a pelletizer or otherwise configured with a pelletizer can be useful in preparing the pellets. In other embodiments of the process of the second embodiment, the blend is extruded into a non-pelletized form (e.g., strands or rods).

Use of the Temperature Stable Polymeric Blend

The temperature stable polymeric blend (e.g., in pellet form) can be subjected to injection molding to prepare a shape from the pellets. Preferably, the injection molding takes place at a temperature of no more than about 265° C.

or no more than 265° C. (e.g., 265, 255, 245, 235, 225, 215, 205, 195, 185, 175, 165 or less), more preferably no than 240° C. (e.g., 240, 230, 220, 210, 200, 190, 180, 170° C. or less); in certain such embodiments, the injection molding takes place at a temperature of 180 to 265° C. (e.g., 180, 185, 190, 195, 200, 205, 210, 215, 220, 225, 230, 235, 240, 245, 250, 255, 260 or 265° C.), more preferably 200 to 240° C. (e.g., 200, 205, 210, 215, 220, 225, 230, 235, or 240° C.). Controlling the temperature at which injection molding takes place (e.g., to a maximum temperature or range as discussed above) can be beneficial in avoiding potential degradation of the thermoplastic polyester elastomer or other components of the blend. In certain embodiments, after an injection molded part is formed, it is subjected to a heat treatment to ensure sufficient crosslinking or curing has occurred; in certain such embodiments, the heat treatment takes place at a temperature of no more than 150° C. (e.g., 150, 140, 130, 120, 110, 100, 90, 80, 70, 60° C. or less), preferably about 80 to about 120° C. or 80 to 120° C. (e.g., 80, 85, 90, 95, 100, 105, 110, 115, or 120° C.).

A preferred use of the temperature stable polymeric blend is the preparation (e.g., by injection molding) of a component for a non-pneumatic tire. Preferably, the component of the non-pneumatic tire is one or more spokes. As used herein, the term "spoke" should be understood as including both elongated spokes (such as disclosed and illustrated in U.S. Pat. No. 7,013,939) as well as interconnected web elements (such as disclosed and illustrated in U.S. Pat. Nos. 8,104,524 and 8,176,957). Generally, however, the spokes that are disclosed herein should not necessarily be considered to be limited to any particular shape or configuration in a non-pneumatic tire. It should be considered that the following are fully disclosed herein. Pellets made from the temperature stable polymeric blend of the first embodiment. Rods or strands made from the temperature stable polymeric blend of the first embodiment. A non-pneumatic tire spoke made from the temperature stable polymeric blend of the first embodiment, where the spoke is preferably made by injection molding. A non-pneumatic tire incorporating one or more spokes made by a process of injection molding the temperature stable polymeric blend according to the first embodiment disclosed herein) wherein the blend is preferably in pellet form prior to injection molding. A non-pneumatic tire incorporating one or more spokes made by a process of compression molding the temperature stable polymeric blend according to the first embodiment disclosed herein) wherein the blend is preferably in pellet form prior to compression molding. A non-pneumatic tire incorporating one or more spokes made by a process of blow molding the temperature stable polymeric blend according to the first embodiment disclosed herein), wherein the blend is preferably in pellet form prior to blow molding. A non-pneumatic tire incorporating one or more spokes made by a process of 3-D printing (or additive manufacturing) the temperature stable polymeric blend according to the first embodiment disclosed herein), wherein the blend is preferably in pellet form prior to printing/manufacturing. Pellets made from a temperature stable polymeric blend produced by the process of the second embodiment. Strands or rods made from a temperature stable polymeric blend produced by the process of the second embodiment. A non-pneumatic tire spoke made by a process according to the second embodiment which process includes injection molding of the blend produced by the process. A process for preparing a non-pneumatic tire spoke by injection molding the temperature stable polymeric blend of the first embodiment, preferably in pellet form. A non-pneumatic tire incorporating one or more spokes made by a process according to the second embodiment which includes injection molding of the blend produced by the process. A process for preparing a non-pneumatic tire including preparing one or more spokes by injection molding the temperature stable polymeric blend of the first embodiment, preferably in pellet form. A non-pneumatic tire spoke made by a process according to the second embodiment which process includes compression molding of the blend produced by the process. A process for preparing a non-pneumatic tire spoke by compression molding the temperature stable polymeric blend of the first embodiment, preferably in pellet form. A non-pneumatic tire incorporating one or more spokes made by a process according to the second embodiment which includes compression molding of the blend produced by the process. A non-pneumatic tire spoke made by a process according to the second embodiment which process includes blow molding of the blend produced by the process. A process for preparing a non-pneumatic tire including preparing one or more spokes by blow molding the temperature stable polymeric blend of the first embodiment, preferably in pellet form. A non-pneumatic tire incorporating one or more spokes made by a process according to the second embodiment which includes blow molding of the blend produced by the process. A process for preparing a non-pneumatic tire by blow molding the temperature stable polymeric blend of the first embodiment, preferably in pellet form. A non-pneumatic tire spoke made by a process according to the second embodiment which process includes 3-D printing (or additive manufacturing) of the blend produced by the process, wherein the blend is preferably in pellet form prior to printing/manufacturing. A process for preparing a non-pneumatic tire spoke by 3-D printing (or additive manufacturing) the temperature stable polymeric blend of the first embodiment, wherein the blend is preferably in pellet form prior to printing/manufacturing. A non-pneumatic tire incorporating one or more spokes made by a process according to the second embodiment which includes 3-D printing (or additive manufacturing) of the blend produced by the process, wherein the blend is preferably in pellet form prior to printing/manufacturing. A process for preparing a non-pneumatic tire including preparing one or more spokes by 3-D printing of (or additive manufacturing of) the temperature stable polymeric blend of the first embodiment, wherein the blend is preferably in pellet form prior to printing/manufacturing.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." All references, including but not limited to patents, patent applications, and non-patent literature are hereby incorporated by reference herein in their entirety. While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A temperature stable polymeric blend comprising:
   a. a thermoplastic polyester elastomer having at least one of:
      i. a Tg of about 50 to about 100° C., or
      ii. a melt temperature of about 200 to about 280,
   b. a high temperature thermoplastic polymer having at least one of:
      i. a Tg of about 200 to about 300° C., or
      ii. a melt temperature of about 300 to about 400° C.,
   c. a compatibilizer resin,
   d. a delayed crosslinking agent, and
   e. an activator,
   wherein the total amount of (a) and (b) is 100 parts, (a) is present in an amount of 30-95 parts, and (b) is present in an amount of 5-70 parts.

2. The temperature stable polymeric blend of claim 1, wherein (a) is a polyether-polyester block copolymer, (b) is a polysulfone polymer, (c) is a phenoxy resin, (d) is an epoxy compound, and (e) is amine-based.

3. The temperature stable polymeric blend of claim 1, wherein the polymeric blend exhibits at least one of:
   a ratio of log storage modulus G' at 175° C. to log storage modulus G' at −40° C. that is no less than 1:150 or
   a strain-controlled cyclic fatigue performance of maintaining at least 95% of its tensile strength for at least 100 million cycles.

4. The temperature stable polymeric blend of claim 1, wherein (a) comprises a polyalkylene-terephthalate-polyalkylene ether glycol copolymer or a polyalkylene-naphthalate-polyalkylene ether glycol copolymer.

5. The temperature stable polymeric blend of claim 1, wherein (b) comprises a polyethersulphone polymer or a polyphenylsulphone polymer.

6. The temperature stable polymeric blend of claim 1, wherein the compatibilizer resin (c) comprises a phenoxy resin and is present in an amount of about 5 to about 20% by weight, based upon the total weight of (a) and (b).

7. The temperature stable polymeric blend of claim 1, wherein the compatibilizer resin has a Mw of about 15,000 to about 60,000 grams/mole.

8. The temperature stable polymeric blend of claim 1, wherein the delayed crosslinking agent (d) is present in an amount of about 0.5 to about 15% by weight, based upon the total weight of (a) and (b), based upon the total weight of (a) and (b), and is selected from the group consisting of epoxidized plant oils and poly-epoxide compounds.

9. The temperature stable polymeric blend of claim 1, wherein at least one of the following is met:
   a. the blend has a modulus E' at 25° C. between 50 and 100 MPa, or
   b. the blend is processable via injection molding at a temperature of 275° C. or less.

10. A non-pneumatic tire comprising a component made from the temperature stable polymeric blend of claim 1.

11. The non-pneumatic tire of claim 10, wherein the component is one or more spokes.

12. A process for preparing a temperature stable polymeric blend comprising
   heating a high temperature thermoplastic polymer to melt the polymer, the high temperature thermoplastic polymer having at least one of:
      a. a Tg of about 200 to about 300° C., or
      b. a melt temperature of about 300 to about 400° C.,
   mixing (i) a thermoplastic polyester elastomer, (ii) a compatibilizer resin, (iii) a delayed crosslinking agent, and (iv) optionally an activator, with the melted polymer to form a blend,
   wherein the thermoplastic polyester elastomer meets at least one of the following:
      c. a Tg of about 50 to about 100° C., or
      d. a melt temperature of about 200 to about 280,
   wherein the heating and mixing occur in an extruder.

13. The process of claim 12, further comprising extruding the blend to produce pellets.

14. The process of claim 13, further comprising injection molding a shape from the pellets.

15. The process of claim 14 wherein the shape is a spoke for a non-pneumatic tire.

16. The process of claim 12, wherein (a) is a polyetherpolyester block copolymer, (b) is a polysulfone polymer, (c) is a phenoxy resin, (d) is an epoxy compound, and (e) is amine-based.

17. The process of claim 12, wherein the heating is to 300 to 400° C.

18. The process of claim 12, further comprising cooling the melted polymer by at least 100° C. prior to mixing any of (ii)-(iv).

19. The process of claim 12, wherein at least one of the compatibilizer resin and the delayed crosslinking agent is added with the thermoplastic polyester elastomer.

20. The process of claim 12, wherein shear is applied during mixing of (i)-(iv) to produce a blend and the compatibilizer resin and the delayed crosslinking agent are added prior to applying shear.

* * * * *